United States Patent [19]

Crow, Jr.

[11] 4,036,304
[45] July 19, 1977

[54] WHEEL MOUNTING FOR CULTIVATOR PLANTER

[76] Inventor: Arthur F. Crow, Jr., R.F.D. 3, Milford, Ill. 60953

[21] Appl. No.: 649,089

[22] Filed: Jan. 14, 1976

[51] Int. Cl.² ............................................. A01B 71/00
[52] U.S. Cl. ................................. 172/260; 172/256; 172/279; 172/292; 180/22; 180/24.02; 180/24.07; 280/81 R; 280/104
[58] Field of Search ............... 172/279, 256, 258, 259, 172/260, 292; 180/22, 24.02, 24.07, 24.08; 280/81 R, 104

[56] References Cited

U.S. PATENT DOCUMENTS

| 2,532,580 | 12/1950 | Tom ..................................... 172/259 |
| 3,319,545 | 5/1967 | Seaman ............................. 180/22 X |
| 3,874,469 | 4/1975 | Sjovall .......................... 180/24.02 X |

FOREIGN PATENT DOCUMENTS

| 1,175,874 | 11/1958 | France ................................... 172/259 |
| 1,097,468 | 1/1968 | United Kingdom ................. 172/292 |

Primary Examiner—Paul E. Shapiro
Attorney, Agent, or Firm—Peck & Peck

[57] ABSTRACT

A self propelled apparatus providing a cultivator, planter units and fertilizer tanks. A traction wheel assembly composed of a plurality of wheels adapted to propel the entire apparatus forwardly by pushing. The plurality of traction wheels being mounted from a traction wheel assembly frame and the traction wheel assembly frame being formed in two sections which are pivoted together at the mid-point thereof. The plurality of traction wheels being arranged in pairs and adjacent pairs of traction wheels being connected together for co-action therebetween. Separate means are provided for driving the traction wheels and such wheels being balanced and mounted from the pivotal frame will impart substantially no compacting forces to the treated soil. The apparatus includes structure and mechanism whereby the sections of the traction wheel assembly frame may be separated to thereby reduce the width of the traction wheel assembly and traction wheel assembly frame for road transport.

9 Claims, 11 Drawing Figures

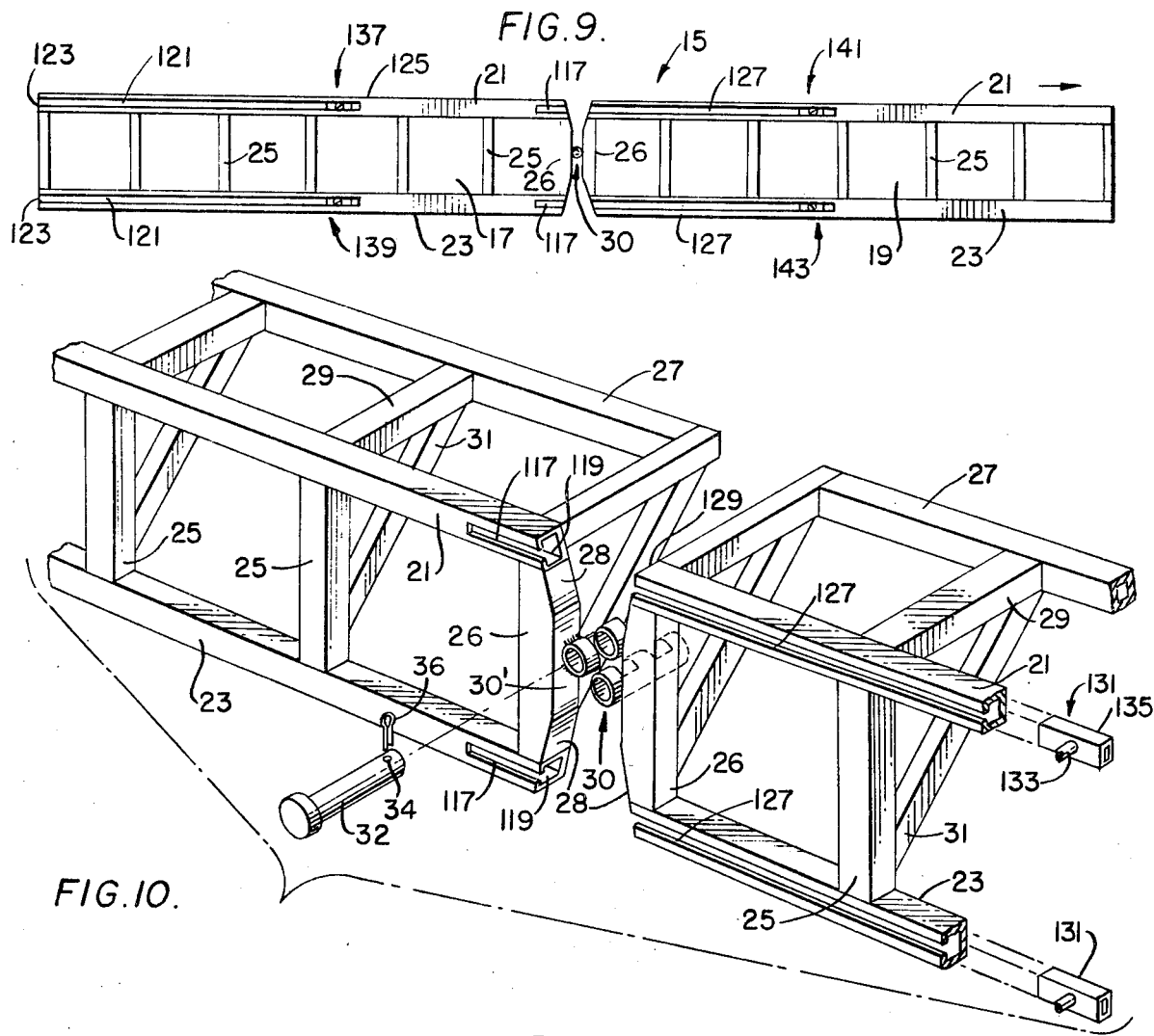
FIG. 9.
FIG. 10.
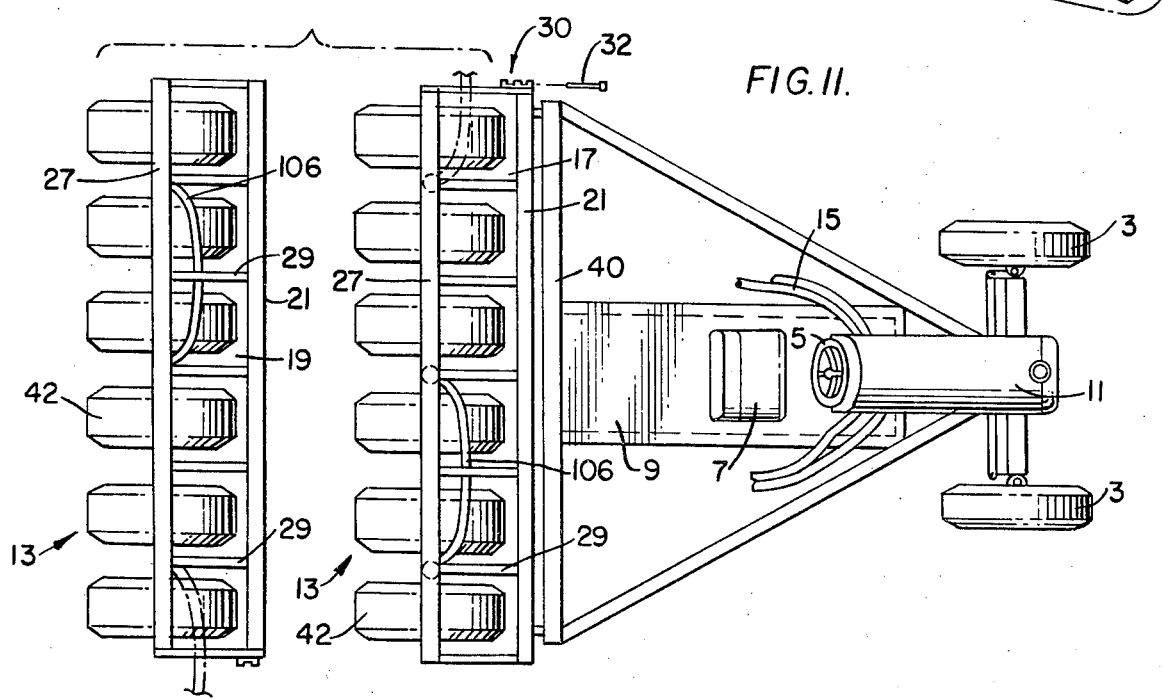
FIG. 11.

WHEEL MOUNTING FOR CULTIVATOR PLANTER

BRIEF SUMMARY OF THE INVENTION

Since the apparatus of this invention is a relatively large one and may be of substantial weight and which prepares the soil, fertilizes it and plants the seed, a power means or traction assembly for the entire apparatus should not compact the soil which has been cultivated into condition for receiving the seeds. The traction assembly which I have devised comprises a plurality of traction wheels which are mounted on a traction wheel assembly frame of the apparatus in position to push forwardly the major components when in operation. The plurality of wheels which comprises the traction wheel assembly are mounted in a unique manner and certain of these wheels are connected together for coaction with each other. The traction wheel assembly is mounted from a traction wheel assembly frame which is so constructed and designed to co-act with the wheels so that when traveling over uneven terrain each wheel will carry substantially the same load and will cause no compaction of the cultivated soil.

The width of this cultivator planter is greater than the width of a normal roadway upon which the cultivator planter would be transported from one area of operation to another. To accommodate the width of such roadways my traction wheel assembly and traction wheel assembly frame are separable so they may be transported independently along the roadway.

Other objects and advantages of the present invention will become apparent from the following description of the preferred embodiment taken in conjunction with the accompanying drawings.

BRIEF DESCRIPTION OF THE SEVERAL VIEWS OF THE DRAWINGS

FIG. 9 is a vertical sectional view of the frame per se and is taken on the line 9—9 of FIG. 4.

FIG. 10 is a fragmentary perspective view of the traction wheel assembly frame, particularly showing that the traction wheel assembly frame is composed of two sections releasably pivotally locked together.

FIG. 11 is a top plan view of the power wheel assembly and the power wheel assembly frame separated for road transport.

DETAILED DESCRIPTION

Figure 1:
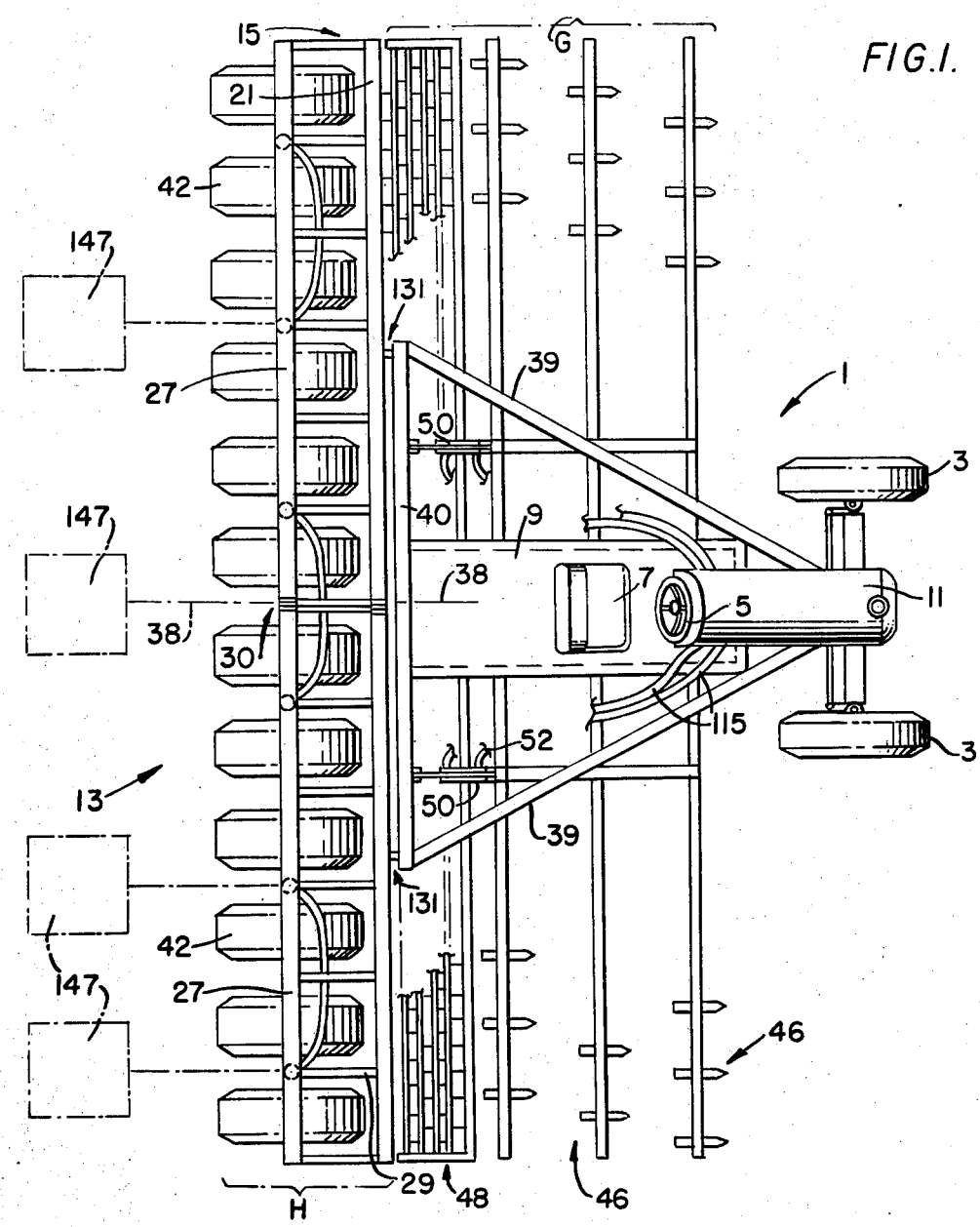
FIG. 1 is a top plan view of the apparatus.
Figure 2:
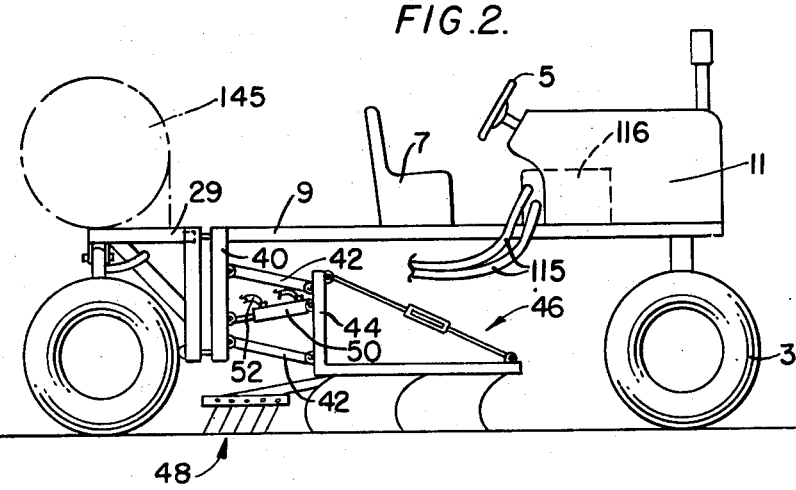
FIG. 2 is a side elevational view of the apparatus of FIG. 1.

In the accompanying drawings I have used the numeral 1 to designate in its entirety a cultivator planter which involves the novel and ingenious features and characteristics which will be described in detail hereinafter. The apparatus provides a pair of steering wheels 3 which are operated by means of a steering member 5 by an operator who may sit in a seat 7 which is provided. The seat 7 is fixed on a power platform 9 upon which is also mounted a housing 11 for a power plant and hydraulic pump unit. The cultivator planter 1 is powered by means of a traction wheel assembly designated generally by the numeral 13. It will be evident from consideration of the drawings that the traction wheel assembly operates at the rear end of the apparatus to push it forward, and it will be further clear from the drawings that the traction wheel assembly is aft of the various ground treating implements which are mounted on the cultivator planter for operation over the ground to be cultivated and planted. As will become apparent as this description proceeds this constitutes a significant characteristic of this invention because the traction wheel assembly 13 which comprises a plurality of traction wheels is so mounted, balanced and arranged that this assembly of the plurality of wheels will not pack down the cultivated and otherwise treated ground. This novel mounting of the traction wheels will be described in detail hereinafter.

In order to aid in the understanding of the description to follow the forward or driven part of the implement has been designated by the letter G, while the rear or drive part of the implement has been designated by the letter H.

The traction wheel assembly 13 is operatively mounted on a frame structure designated in its entirety by the numeral 15, and which I have termed the traction wheel assembly frame and this frame structure is formed in two separable sections 17 and 19 for a purpose to be hereinafter made clear. Each frame section 17 and 19 consists of a horizontally extending upper forward bar element 21, the overall length of the two bar elements 21 of the two sections being slightly longer than the overall width of the traction wheel assembly 13, as is evident from FIG. 1 of the drawings. A pair of horizontally extending lower bar elements 23 are provided on each section 17 and 19 and are vertically coplanar with the upper bar elements 21. The bar elements 21 and 23 are maintained in proper vertically spaced position by means of a plurality of horizontally spaced vertically extending elements 25. I provide bar element 27 which is rearwardly spaced from the bar elements 21 by means of a plurality of horizontally spaced and horizontally extending strut elements 29, such strut elements extending between and fixed to the bar elements 21 and 27. It will be recognized that the bar elements 21 and 27 are in the same horizontal plane. The traction wheel assembly frame 15 and the various elements thereof which have just been described may be reinforced by a plurality of diagonally extending strut elements 31.

I have designated each vertically extending adjacent strut an the inner end of each section 17 and 19 of the traction wheel assembly frame 15 by the numeral 26, and when the sections 17 and 19 are in operative positions pivotally connected together, as will be described, the struts 26 will be adjacent each other. The inner vertical faces of each end of each strut 26 is bevelled as at 28 to allow relative pivoting action between the sections 17 and 19. To the vertical surfaces 30' of each strut 26 is affixed to ring element of a piano type hinge designated in its entirety by the numeral 30. When these two parts of the piano hinge are mated in operative condition a pin 32 having a hole 34 bored diametrically therethrough is inserted into the ring elements forming the piano hinge 30 and is releasably maintained in operative position within the piano hinge by means of a cotter pin 36 which is inserted through the hole 34 and the extending ends thereof are flared as in the usual case of a cotter pin. Thus, with the pin 32 in the just described operative position it will be seen that the two sections 17 and 19 of the traction wheel assembly frame 15 are pivotally releasably connected together at a mid point of the assembly, as described by the phantom line 38 in FIG. 1 of the drawings.

The forward or driven part G of the implement includes a pair of connecting or tie rods 39 which extend rearwardly and divergently from the forward part G of the implement and are fixed at their rear ends to a rigid depending member 40 which, in effect, constitutes the connecting means between the traction wheel assembly frame 15 and the forward part G of the apparatus, so that the traction wheel assembly when in operation will push this forward assembly of the apparatus in a forward direction.

Extending forwardly from the depending member 40 are two pair of parallel bars 42, one pair of each side of member 40, which are pivotally attached at the rear end to the member 40 and at their forward ends to an element 44 which forms part of any conventional and well known spring tooth cultivator assembly 46, from which a further soil treating tine including member 48 is towed. Also pivotally fixed to and extending between the member 40 and the element 44 are a pair of draft or lift control cylinders 50 having fluid lines 52 extending thereinto. These draft control cylinders are operated by the driver of the apparatus. It is within my contemplation to provide the apparatus with more draft control cylinders if it is found to facilitate the operation of this part of the apparatus. It will be appreciated that any suitable instrument panel may be positioned in accessible position for control and operation by the driver. Since this instrumentation forms no part per se of this invention, it is not believed necessary to illustrate it in detail. It is to be understood that any conventional mounting and supporting arrangement for the cultivating and other soil treating apparatus may be employed and such will fall within the spirit and scope of this invention.

The traction wheel assembly 13 is composed of a plurality of wheels 42, in this instance I have provided twelve of such traction wheels, and this assembly of traction wheels is so mounted and constructed that it provides six pairs of wheels A, B, C, D, E and F, each pair of wheels being independent of the other pairs, with the exception that adjacent pairs of wheels of the assembly are connected together so that there will be co-action between such adjacent pairs of wheels. Thus, pairs A and B, C and D, and E and F are hydraulically connected together for co-action therebetween.

Figure 7:
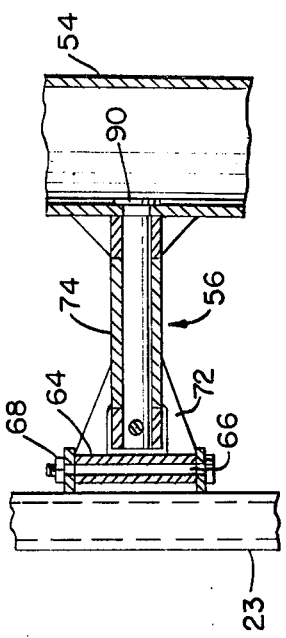
FIG. 7 is a fragmentary horizontal sectional view taken on the line 7—7 of FIG. 5 and especially illustrating the horizontal pivotal connection between a pair of wheels and the traction wheel assembly frame which allows each paired wheel assembly to tilt and to have vertical movement.
Figure 5:
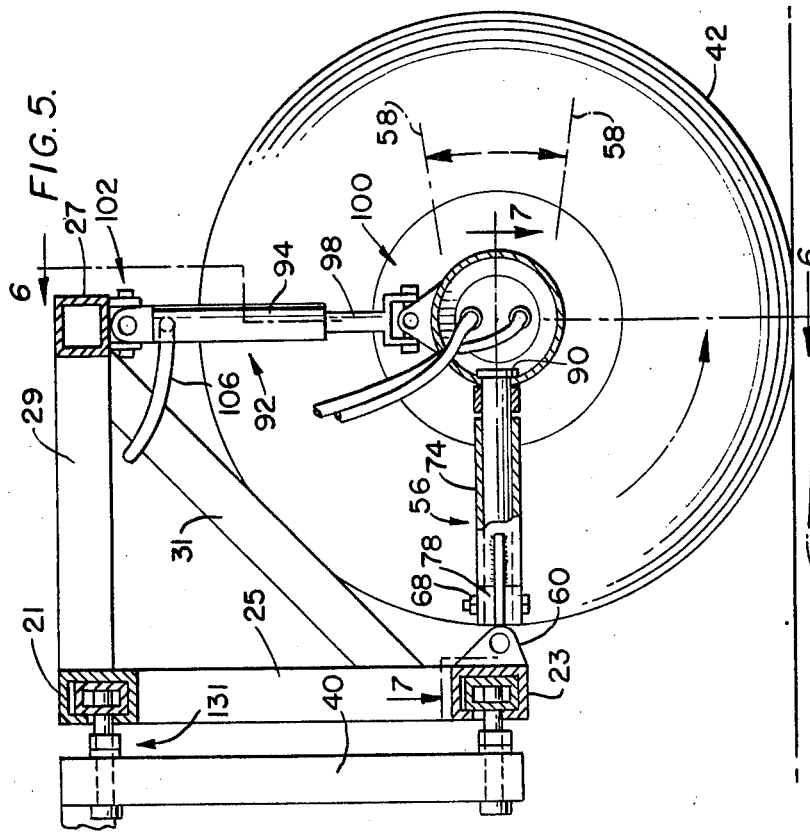
FIG. 5 is an enlarged view taken on the line 5—5 of FIG. 3 particularly illustrating the pressure cylinder which is provided for each pair of wheels and also illustrating the horizontally pivoted connecting means extending from the traction wheel assembly frame to the hub assembly.
Figure 8:
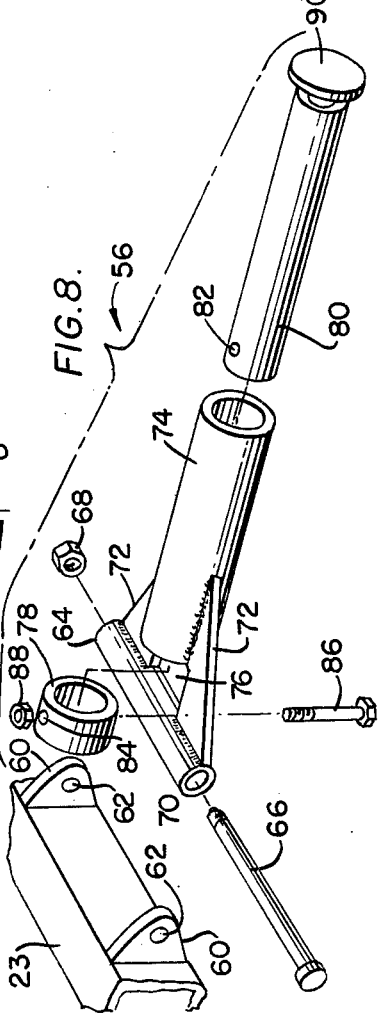
FIG. 8 is an exploded perspective view of the elements illustrated in FIG. 7.

The wheels 42 of each pair of wheels are journaled on and connected by an axle 54, said axle being of substantial diameter to house various elements which will be described. Centrally disposed between the wheels of each pair of wheels is a means for connecting each axle and a bar element 23 of the traction wheel assembly frame. This connecting means which I have designated generally by the numeral 56 extends between a bar element 23 and an axle 54, as is clearly illustrated in FIGS. 5 and 7 of the drawings. The means 56 permits vertical movement of a pair of wheels as well as oscillatory motion as disclosed particularly in FIG. 5 by the lines 58. The connecting means 56 comprises a pair of horizontally spaced bracket members 60 which are fixed to and extend rearwardly from the bar element 23 and each such bracket member is provided with an aperture 62, the apertures being in horizontal alignment. The means also includes a hollow tube or sleeve member 64 which is of a length to fit between the brackets 60 and to be maintained between said brackets by means of a bolt 66 which extends through the apertures 62 and the sleeve 64 and is maintained in this position by means of a nut 68 which is adapted to be threaded on the threaded end 70 of the bolt 66. Welded or otherwise affixed to the sleeve 64 are a pair of horizontal spaced rearwardly extending wing-like member 72. I provide a rearwardly extending sleeve 74 which is fixed between the outer ends of the wing-like member 72 as by welding or in any other suitable and desirable manner. It is to be noted that when the sleeve 74 is fixedly positioned within the wing-like member 72 it is rearwardly spaced from the sleeve 64 to leave an area 76 between the two sleeves. The connecting means assembly 56 also includes an annular member 78 which when in operative position is disposed in the area 76. An elongated element 80 having alined apertures 82 therein is dimensionally such that it may be inserted into the sleeve 74 and into the annular member 78. The apertures 82 in the element 80 are in vertical alignment when in this inserted position with apertures 84 which are formed in the annular member 78, the element 80 being maintained in its position within the sleeve 74 and the annulus 78 by means of a threaded bolt 86 which is passed through the apertures 82 and 84 and maintained in such position by means of a nut 88 which is threaded on the end of the bolt 86. The entire assembly of the connection means 56 when assembled as described extends between the bar element 23 and the axle 54 and the head 90 on the element 80 is affixed in any suitable manner to the axle 54. It is to be understood that such a connecting means 56 extends between each axle 54 of each pair of wheels, so that, in the example disclosed, there are six of each means, and each of such means is of the same construction as the one just described. The connecting means 56 functions as a universal joint, thus vertical movement of a pair of wheels is accommodated by the means or the universal joint structure 56 by rotation of the sleeve 64 between the bracket members 60 while any oscillating movement of a pair of wheels results in a slight rotational movement of the elongated element 80 relative to the sleeve 74, and since the inner end of the element 80 is received within and fixed to the annulus it will rotate within the area 76 commensurate with the rotation of the elongated element 80.

Figure 3:
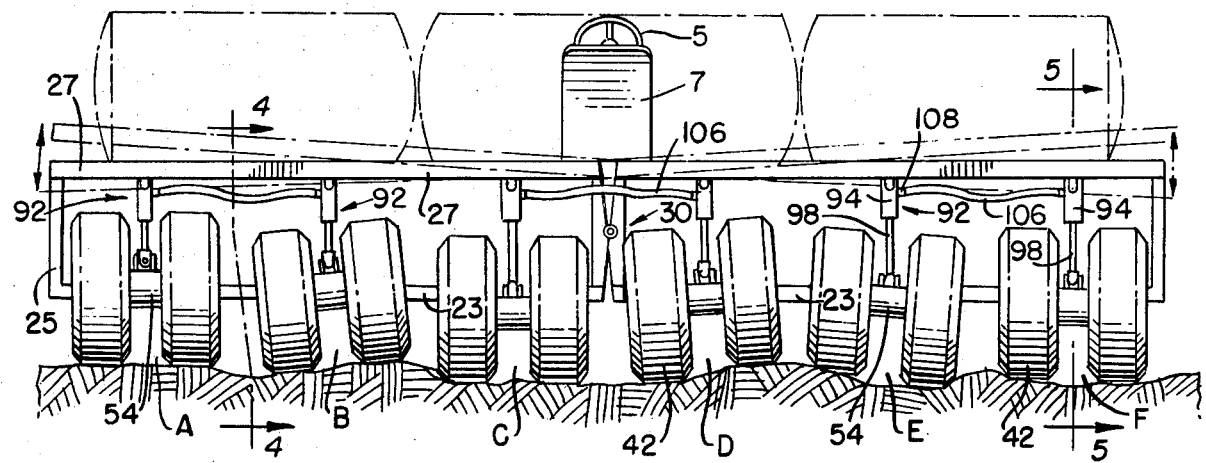
FIG. 3 is a rear elevational view of the traction wheel assembly and particularly indicating various angles of tilt which are assumed by the paired components of the assembly when transversing uneven terrain.

The novel and ingenious means which I have employed along with the pivoted traction wheel assembly frame to balance adjacent pairs of wheels of the traction wheel assembly 13 has been designated generally by the numeral 92. This balancing means, as will be described, cooperates with the traction wheel assembly frame to prevent compaction of the tilled soil. It must be appreciated, and as is particularly illustrated in FIG. 3, that the balancing means is provided for each pair of wheels of the traction wheel assembly and the balancing means of adjacent pairs of wheels are interconnected as will be described hereinafter. The balancing means 92 is generally vertically disposed to extend between the axle 54 of a pair of wheels and the bar element 27 of the traction wheel assembly frame 15 and is so mounted, that it does not restrain or affect any vertical movement of a pair of wheels or oscillatory movement thereof.

The balancing means comprises generally a hydraulic cylinder 94 in which operates a piston 96 from which downwardly depends a piston rod 98. At its lower end, the piston rod 98 is fixed to the axle 54 by any suitable type universal joint designated in its entirety by the numeral 100. The hydraulic cylinder 94 at its upper end is fixed by means of a universal joint designated by the numeral 102 to the rear cross bar 27 of the traction wheel assembly frame 15. The charge of fluid within the cylinder 94 is designated by the numeral 104. A hydraulic hose 106 is connected into the interior of the hydraulic cylinder by means of a nipple 108. Consideration of FIG. 3 of the drawings clearly shows that the hydraulic cylinders 94 of adjacent pairs of wheels are connected by a fluid line 106. Thus, the two pairs of wheels A and B are hydraulically connected together, as are the other adjacent pairs of wheels C and D and E and F.

As has been stated, the traction wheel assembly 13 constitutes the motive power for the entire apparatus and each wheel 42 of the traction wheel assembly is hydraulically driven. The axle 54 for each pair of wheels A, B, C, D, E, F, houses components which hydraulically drive each wheel of the traction wheel assembly. A pair of torque hubs 110, one being provided for each wheel of a pair of wheels, the hub being fixed to its wheel and two hydraulic motors 112 are provided, each being operatively connected to a torque hub 110. Fluid flow lines 114 are provided for each hydraulic motor 112 and these flow lines extend as at 115 to and from a power plant and hydro pump unit which is schematically shown at 116. It will be understood that the necessary number of fluid flow lines will in actual use be provided, that is such lines will extend to and from the unit 116 to the draft control cylinders 50 and the various motors 112, all as well known in the art of hydraulics.

Consideration of FIGS. 9 and 10 indicates that the upper and lower bar elements 21 and 23, respectively, of section 17 of the traction wheel assembly frame are slotted on their forward surfaces as at 117. These slots 117 extend outwardly a limited distance along the bar elements and are open at their inner ends at 119. The drawings clearly show that each of the slots 117 extends horizontally and outwardly along the bar elements and that their open ends are adjacent the pivot point 30 between the sections 17 and 19 of the traction wheel assembly frame 5. As is clearly illustrated, particularly in FIG. 9, the bar elements 21 and 23 of the section 17 of the traction wheel assembly frame 15 are provided with further slots 121 which are similar in configuration and structure to the slots 117. The slots 121 extend from the outer ends 123 of the bar elements inwardly a distance, however the inner ends 125 of the slots 121 are spaced a substantial distance from the outer ends of the slots 117. Bar elements 21 and 23 of section 19 of the traction wheel assembly frame 15 are also provided on their forward sides with slots 127, such slots at their inner ends are open as at 129 and such inner ends are adjacent the pivot point 30. It will be recognized that the slots 127 extend horizontally along the bar elements a limited distance which may be on the order of the mid point of such bar elements of the section 19.

Figure 4:
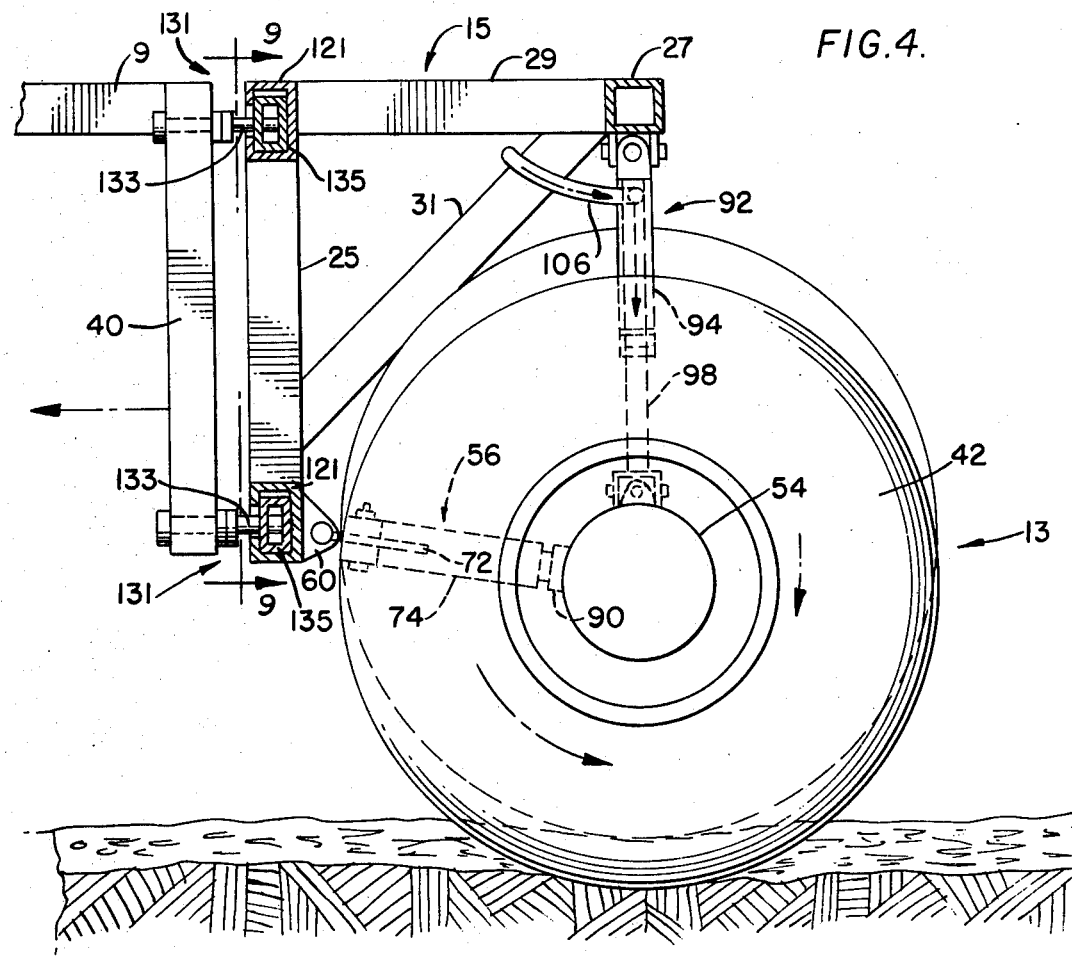
FIG. 4 is an enlarged view taken on line 4—4 of FIG. 3 particularly illustrating the tilt of a pair of wheels of the traction wheel assembly with one wheel thereof at a higher elevation than the other.
Figure 6:
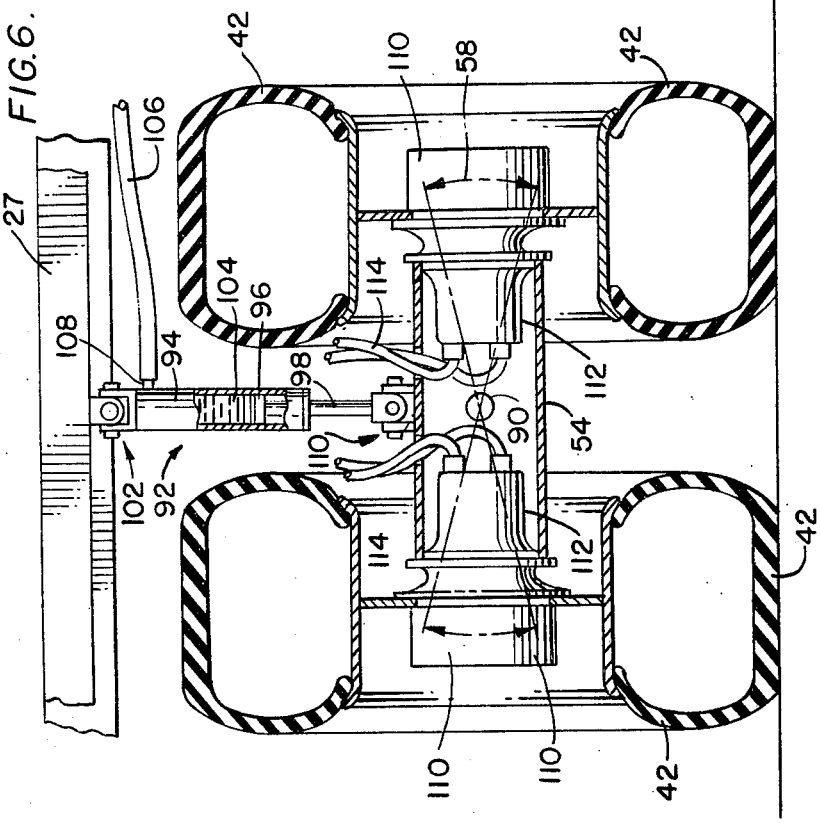
FIG. 6 is a vertical sectional view taken on the line 6—6 of FIG. 5 illustrating a cylinder and piston which is connected to the frame and the hub assembly and illustrating the two hub mounted hydraulic motors.

The depending member 40 is provided with two pairs of sliding shoe and pivot connections to operatively connect the traction wheel assembly frame 15 to the forward part G of the apparatus. I have used the numeral 131 to designate in their entireties the pivot and sliding shoe connections. I provide a pair of horizontally spaced pivot and sliding shoe connections 131 which are fixed to and extend rearwardly from the depending member 40 as is clearly disclosed in FIG. 1 of the drawings. A further pair of pivot and sliding shoe connections 131 are positioned adjacent the lower end of the depending member 40 and are in vertical alignment with the upper connections 131. This arrangement of the connections 131 is clearly illustrated in FIG. 4. Each connection 131 provides a rearwardly extending pin or stud 133 which is fixed in any suitable manner to the depending member 40. On the outer end of each pin or stud 133 is operatively mounted a pivoted shoe 135 which is dimensionally such that it will be freely and slidably received in the slots which are provided in the bar elements of the traction wheel assembly frame 15, and as especially illustrated in FIG. 9 of the drawings.

As has been stated hereinabove when the apparatus is operating the sections 17 and 19 of the traction wheel assembly frame 15 may pivot because of the releasable pivoted connection at 30, such pivoting action being caused by vertical movement of the traction wheels as they travel over uneven terrain. This pivoting action of the sections of the traction wheel assembly frame may take place due to the fact that the slots 121 and 127 are of greater dimension than the shoes 135 which are adapted to slide therein. Thus, the traction wheel assembly frame may have this just described pivoting motion relative to the fixed depending member 40. It is within my contimplation to provide other means for permitting such relative motion of the sections of the traction wheel assembly frame with respect to the fixed depending member 40, and such other means will fall within the spirit and scope of this invention.

For purposes of descriptive clarity in FIG. 9 I have used different numerals to designate the four connecting means 131. Thus, the upper connecting means of one vertical pair of connecting means is designated in FIG. 9 in its entirety by the numeral 137 while the lower connecting means of said pair is described by the numeral 139. The other vertically aligned pair of connecting means involves the upper connecting means and is designated in its entirety by the numeral 141 while the lower connecting means of said pair is designated by the numeral 143. Thus, when the traction wheel assembly frame 15 is in operative position connected to the forward part G of the apparatus by means of the connecting means 131 and the two sections 17 and 19 are releasably connected together at the pivot point 30 as described, the entire apparatus is in condition for cultivating the soil and planting therein. Such operation being controlled by the driver and operator of the apparatus.

A plurality of fertilizer containing tanks 145 may be mounted in any suitable manner on the traction wheel assembly frame 15 and a plurality of planters 147 may be connected to the traction wheel assembly 15 and towed therebehind for planting seed into the cultivated and prepared ground. Since planters are well known in the agriculture discipline such planters have only been schematically shown in the drawings.

The traction wheel assembly frame is of a width on the order of 30 feet and it is necessary in many instances when such apparatus is being moved from one area to another that it be transported along conventional roads which in most instances are of substantially less width than the width of the apparatus when in operative condition. This problem has been solved by making the traction wheel assembly frame in two sections which are pivoted together and are separable for road transport. I accomplish this separation of the traction frame assembly into two parts or sections for road transport by removing the cotter pin 36 from the pin 32 which is then removed from the hinge sections which are provided on each section 17 and 19. Thus, with this done the two frame sections may be separated. In accomplishing this the section 19 is pulled to the right as shown in FIG. 9, the connecting means 141 and 143 sliding in the slots 127 to the left in that figure. When the connecting means 141 and 143 are fully slid outside the slots 127, the section 17 is then moved to the right in FIG. 9 so that the connecting means 141 and 143 will enter the slots 117 in the section 17 and simultaneously the connecting means 137 and 139 will move in their slots 121 to the left in FIG. 9. When this described movements of the sections has been completed, the section 19 constitutes a separate unit of approximately 15 feet as will the section 17. With the sections 17 and 19 separated and with the section 19 completely free of the section 17 the forward part G of the apparatus may be removed from the section 17 so that said section may be towed by a tractor and section 19 may also be towed by a tractor.

When the traction wheel assembly frame 15 is separated into the two sections 17 and 19 it will be recognized that the hydraulic hose 106 which connects the two pairs of wheels C and D must be separable. This may be accomplished by detaching one end thereof from the nipple 108, or if it is desired the hydraulic hose 106 may be provided with a detachable connection of any suitable kind at a point along its length.

It will now be evident from the above description that I have devised a self-propelled farm implement that functions to prepare the seed bed and then to plant the seed, as well as fertilizing the prepared bed prior to depositing the seeds therein. This implement is propelled by a traction wheel assembly 13 which comprises a plurality of traction or power wheels 42 and it is a significant characteristic of this invention to so mount and balance the traction wheel assembly that these traction wheels provide the motive power for the entire apparatus, and by means of this balancing and co-active mounting of the wheels the entire load is balanced so that each traction wheel carries its own share of the load. In evolving this successful balancing arrangement and mechanism for the traction wheels, I have provided a traction wheel assembly frame 15 which has been fully described in detail above and the plurality of traction wheels are operatively mounted and connected to the traction wheel assembly frame. This traction wheel assembly frame is sectionally formed and the two sections and pivoted together so that one section may pivot relative to the other under the action of the various wheels as they traverse terrain which may be even or uneven. Since the traction wheels of this apparatus are at the rear end of the apparatus and push the entire apparatus forward, it is significant to so mount and arrange the plurality of the wheels so that they impart no soil damaging compacting action to the soil which has been cultivated in advance of the traction wheels. This wheel mounting in conjunction with the pivoted traction wheel assembly frame produces these desirable characteristics and it imparts substantially no compacting forces on the treated soil. The fact that I provide a plurality of traction wheels provides sufficient traction to move the apparatus forward even though the load on each wheel will not be great.

Do to the fact that each adjacent pair of wheels of the plurality of wheels of the traction wheel assembly are hydraulically connected together when these two adjacent pairs of wheels hit a high spot in the terrain being traversed by the apparatus, the section of the traction wheel assembly frame from which these adjacent pairs of wheels are mounted will move up with no great amount of hydraulic fluid flowing. Also, when a pair of wheels hits a high spot that section of the frame from which that pair of wheels is mounted will pivot and move upwardly with respect to the other section of the frame. The fact must not be lost sight of in this balancing and co-action of the wheels with the frame as described, that the traction wheel assembly frame is formed in two sections and that the two sections are pivoted together at a mid point with respect to the entire traction wheel assembly frame.

What is claimed is:

1. A cultivator planter including a drive section and a driven section, the driven section being forwardly positioned with respect to the drive section, the drive section including a plurality of traction wheels and a frame of substantial width from which said plurality of traction wheels are mounted, said frame being formed in two longitudinally extending sections, means provided on the adjacent ends of said two sections for releasably locking said sections together, the driven section including manually operable steering wheels and a plurality of cultivating implements and said drive and driven sections being releasably connected together.

2. A cultivator planter including a drive section and a driven section, the driven section being forwardly positioned with respect to the drive section, means including structure releasably locking and pivotally connecting said drive and driven sections together, the drive section including a plurality of traction wheels and a frame of substantial width from which said plurality of traction wheels are mounted, said frame being formed in two longitudinally extending sections, further means provided on the adjacent ends of said two sections for releasably connecting said sections together, and said further means includes structure releasably locking said two sections together and pivotally connecting them together.

3. A cultivator planter in accordance with claim 2, wherein means is provided for releasably connecting said drive and driven sections together and said means includes structure whereby pivotal action may occur between said drive and driven sections when said two sections of said frame pivot with respect to one another.

4. A cultivator planter in accordance with claim 3, wherein said means includes further structure whereby said two sections of said frame may be moved laterally with respect to said driven section when said two sections of the frame are released from their locked together position.

5. A cultivator planter in accordance with claim 3, wherein said further structure includes a pivoted member extending from said driven section and slots are provided on said frame and said pivoted member is slidably received therein for lateral movement of said frame relative to said driven section.

6. A cultivator planter in accordance with claim 5, wherein said slots are provided on each of said sections of said frame and all of said slots have one open end whereby said pivoted member may be slid free of said slots.

7. A cultivator planter including a drive section and a driven section, the driven section being forwardly positioned with respect to the drive section, the drive section including a plurality of traction wheels and a frame from which said plurality of traction wheels are mounted, and said plurality of traction wheels comprise a plurality of units and each unit comprises two wheels, an axle being provided for each pair of wheels of a unit and each axle being independent of each other axle, a universal joint being fixed to said frame and extending from said frame to an axle whereby each axle of each unit is mounted from said frame for universal movement with respect thereto.

8. A cultivator planter in accordance with claim 7, wherein a hydraulic cylinder and piston is provided for each axle said piston having a piston rod extending exteriorally of said hydraulic cylinder, said hydraulic cylinder having a charge of hydraulic fluid therein, a universal joint fixed to said frame and to one end of said hydraulic cylinder and a further universal joint fixed to said axle and to said piston rod.

9. A cultivator planter in accordance with claim 8, wherein fluid flow means is provided between adjacent units of wheels, said fluid flow means connected to each of said cylinders on adjacent units whereby fluid may flow to and from the cylinders on adjacent units.

* * * * *